United States Patent [19]

Müller et al.

[11] Patent Number: 4,912,813
[45] Date of Patent: Apr. 3, 1990

[54] BELT CONNECTION MECHANISM

[75] Inventors: Anton Müller, Aalen-Unterkochen; Hermann Schinko, Hüttlingen, both of Fed. Rep. of Germany

[73] Assignee: Eisen- und Drahtwerk Erlau Aktiengesellschaft, Aalen, Fed. Rep. of Germany

[21] Appl. No.: 164,176

[22] Filed: Mar. 4, 1988

[30] Foreign Application Priority Data

Mar. 6, 1987 [DE] Fed. Rep. of Germany ... 8703372[U]

[51] Int. Cl.⁴ .............................................. B25B 25/00
[52] U.S. Cl. ................................ 24/68 CD; 24/68 R; 24/265 CD
[58] Field of Search ................ 24/68 CD, 68 R, 68 B, 24/265 CD, 265 BC, 269; 52/23, DIG. 11; 254/222, 224

[56] References Cited

U.S. PATENT DOCUMENTS

| 2,736,262 | 2/1956 | Elsner | 24/265 CD X |
| 3,673,642 | 7/1972 | Harwell | 24/68 CD |
| 3,881,694 | 5/1975 | Gardner | 24/68 R |
| 3,884,450 | 5/1975 | Brammer | 24/68 R |
| 3,988,007 | 10/1976 | Freiburger, Jr. | 24/68 R |
| 4,143,445 | 3/1979 | Fougman | 24/68 R |
| 4,584,742 | 4/1986 | Speich | 24/68 CD |

FOREIGN PATENT DOCUMENTS 3215723 9/1988 Fed. Rep. of Germany .

Primary Examiner—Laurie K. Cranmer
Attorney, Agent, or Firm—Robert W. Becker & Associates

[57] ABSTRACT

A belt connection mechanism having a rotatable connection element. The connection element is mounted in a bracket and can be shifted axially out of a locking position against spring force. In the locking position, detents provided on at least one end of the connection element engage in arresting notches of the bracket. In the locking position, an abutment of the connection element rests under the spring force against an abutment surface of the bracket.

15 Claims, 3 Drawing Sheets

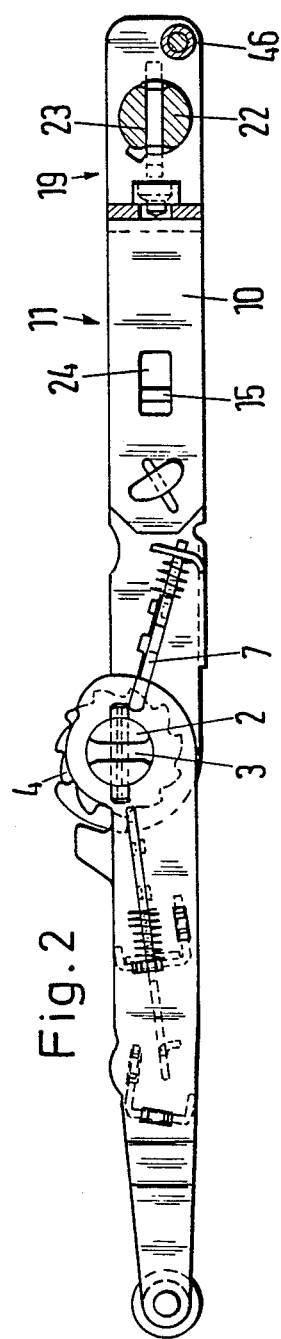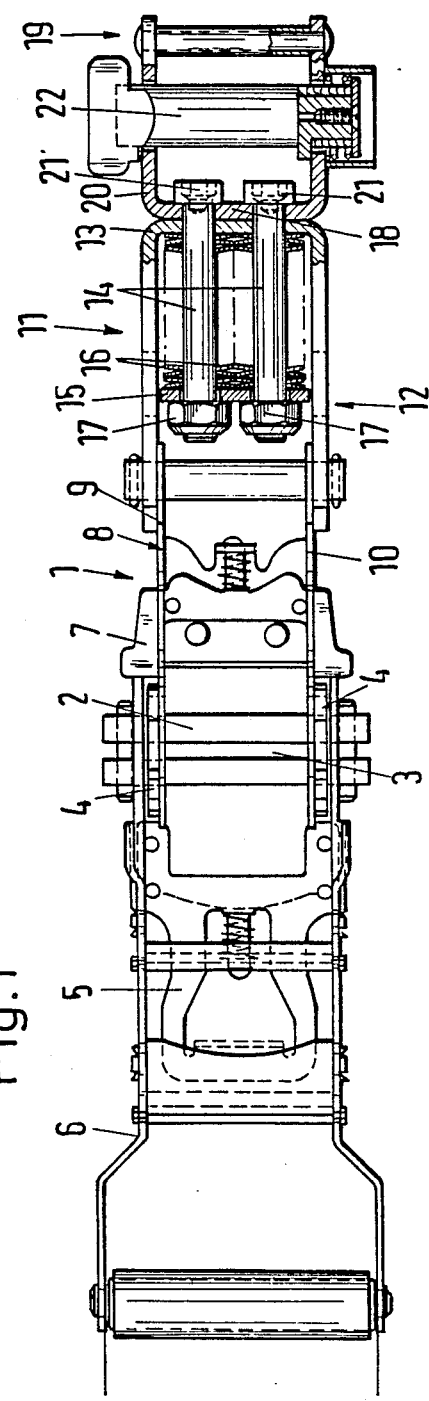
Fig.1
Fig.2

4,912,813

BELT CONNECTION MECHANISM

BACKGROUND OF THE INVENTION

The present invention relates to a belt connection mechanism that has at least one rotatable connection element for a belt; the connection element has two ends, is provided with a grip, and is mounted in a bracket in such a way that it can be shifted axially out of a locking position against spring force.

In one known belt connection mechanism of this general type (German Offenlegungsschrift 32 15 723 Müller et al dated Sept. 22, 1988 and belonging to the assignee of the present invention), a single detent provided at one end of the connection element engages in an arresting notch of the bracket in the locking position. The bracket has holes for the connection element to extend through, with the latter being formed by a pintle, one end of which is provided with the single radially projecting detent, via which, in the locking position, it engages in the arresting notch of the bracket. If the connection element is to be connected with the belt, the connection member is shifted against spring force to such an extent that the detent is released from the arresting notch. The connection element is subsequently rotated by 180° until the detent has reached the region of an opening in the bracket. The connection element can then be retracted axially. The belt that is to be connected is provided with loops at its ends, with the connection element subsequently being inserted through these loops. The connection element is then again locked on the bracket via the detent. The drawback of this heretofore known belt connection mechanism is that the belt cannot be wound up with the connection element thereof. Rather, it is possible only to secure the belt in different positions on the bracket in conformity with the number of loops on the belt.

It is therefore an object of the present invention to improve the belt connection mechanism of the aforementioned general type in such a way that a belt can be wound upon the connection element via a mechanism that takes up little space.

BRIEF DESCRIPTION OF THE DRAWINGS

This object, and other objects and advantages of the present invention, will appear more clearly from the following specification in conjunction with the accompanying schematic drawings, in which:

FIG. 1 is a partially cross-sectioned plan view of a first exemplary embodiment of the inventive belt connection mechanism, which is part of a pre-loading force indicator of a ratchet mechanism;

FIG. 2 is a partially cross-sectioned side view of the belt connection mechanism and ratchet mechanism of FIG. 1;

SUMMARY OF THE INVENTION

Figure 4:
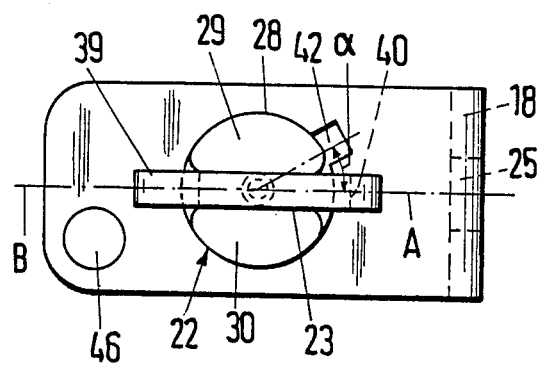
FIG. 4 is a side view of the belt connection mechanism of FIG. 3.

The belt connection mechanism of the present invention is characterized primarily by at least two detents, provided on at least one of the ends of the connection element, with the detents engaging in appropriate arresting notches of the bracket in the locking position of the connection element; the latter is furthermore provided with a pass-through slot for receiving the belt; and the bracket is provided with first abutment means, while the grip of the connection element is provided with second abutment means via which the grip, in the locking position and under the spring force, rests against the first abutment means of the bracket.

As a result of the inventive configuration, the appropriate end of the belt can be easily inserted into the pass-through slot of the connection element of the novel belt connection mechanism. The end of the belt is then wound up by rotating the connection element. By means of the two detents, the connection element, in the belt-introduction position, is reliably supported against the bracket relative to the spring force, so that after the end of the belt has been inserted, the connection element can be easily rotated. As soon as the detents reach the region of the arresting notches, the detents automatically engage or catch in the arresting notches under the spring force. Since the detents are provided on the connection element, the inventive belt connection mechanism has a straightforward construction. In particular, the inventive belt connection mechanism can be relatively short, since no separate locking devices are required for the connection element. As a result, the inventive belt connection mechanism, for example, can be provided on ratchet mechanisms without the latter thereby becoming excessively long. Furthermore, the belt connection mechanism can also be provided with a connection element to which hooks, links, etc. can be connected. In both cases, i.e. where the inventive belt connection mechanism is connected to a ratchet mechanism and where it is provided with a connection element, the same construction is used for the connection element with its protection against rotation, so that the winding mechanism is the same in both cases, which has an advantageous effect with regard to operating personnel.

Further specific features of the present invention will be described in detail subsequently.

DESCRIPTION OF PREFERRED EMBODIMENTS

Referring now to the drawings in detail, the inventive belt connection mechanism of FIGS. 1 to 4 is connected to a ratchet mechanism 1 that has a rotatably mounted drive roller 2 with a pass through slot 3 for one end of a belt. The roller 2 is fixedly connected to at least one ratchet wheel 4 with which a coupling pawl 5 meshes under spring force. The coupling or driving pawl 5 is accommodated in a drive member 6 that is pivotable about the axis of the roller 2. The ratchet wheel 4 is prevented from rotating back by a locking pawl 7 that is displaceably mounted in a known manner in the ratchet mechanism 1, and meshes with the ratchet wheel 4 under spring force. The locking pawl 7 is mounted in a connection member 8 of the ratchet, with this connection member having 2 parallel arms 9 and 10. The pre-loading force indicator 11 is detachably secured to those ends of the arms 9 and 10 that are remote from the roller 2. The indicator 11 has a U-shaped connection element 12, with two guide bolts 14 extending through the crosspiece 13 of the connection element 12. Mounted on the guide bolts 14 is a plate-like support 15 for compression springs 16. Under the force of the springs 16, which in the illustrated embodiment are formed by sets of plate or cup springs, the support 15 is braced against nuts 17 that are screwed onto the threaded ends of the guide bolts 14. These bolts also extend through a crosspiece 18 of a carrier or bracket 20 of the inventive belt connection mechanism 19. The heads 21 of the guide bolts 14 rest against that side of the crosspiece 18 of the bracket 20 that is remote from the connection element 12; the heads 21 of the bolts can be welded to the crosspiece 18.

Rotatably mounted in the bracket 20 of the belt connection mechanism 19 is a connection or winding element 22 for a belt.

The ratchet mechanism 1 with the belt connection mechanism 19 is used for lashing belts. One end of the belt is inserted through the passthrough slot 3 of the roller 2, while the other end of the belt is inserted through a pass-through slot 23 of the roll-up or winding element 22. The winding element 22 is then rotated by at least 360°, as a result of which the belt end is wound onto the element 22. The other end of the belt is subsequently wound onto the roller 2 via the drive member 6 in a known manner, thereby lashing the belt. As soon as the lashing tension has exceeded a prescribed value, the ratchet mechanism 1 and the belt connection mechanism 19 are shifted relative to one another against the force of the compression springs 16. In this connection, the support 15 serves as a force indicator. An opening 24 is provided in the arms 9, 10 of the connection member 8, so that the position of the support 15 is visible. Notches or other markings are provided along the edge of the opening 24 to indicate tension. Thus, the lashing tension at any given time can be easily recognized by the position of the support 15.

Figure 3:
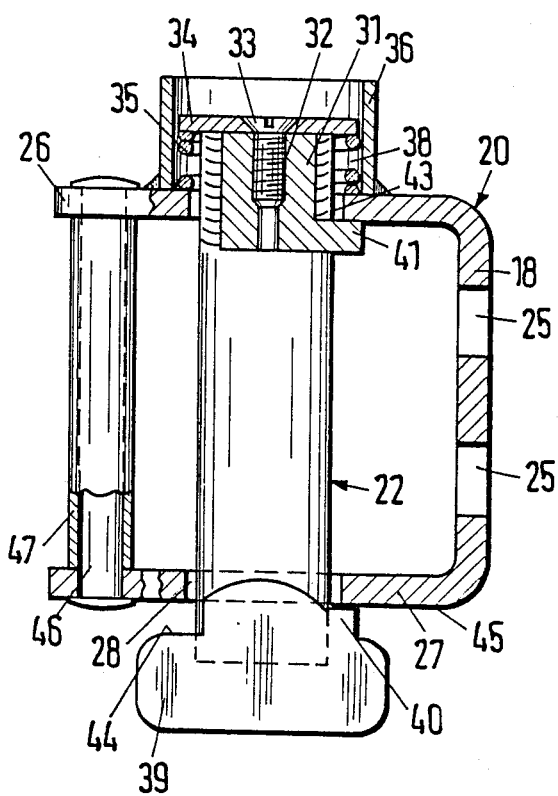
FIG. 3 is an enlarged and partially cross-sectioned view of the belt connection mechanism of FIG. 1.

As shown in detail in FIGS. 3 and 4, the bracket 20 is a sheet metal part that has been bent into a U shape. Two openings 25 are provided in the crosspiece 18 for the guide bolts 14. Each of the legs 26, 27 of the bracket 20 has a circular hole 28 for the winding element 22. The latter is formed from two profiled elements 29, 30 that have an approximately semicircular cross-sectional shape. Those sides of the profiled elements 29, 30 that face one another extend parallel to one another and delimit the pass-through slot 23. In the region beyond this slot, the profiled elements 29, 30 are rigidly interconnected, preferably by being welded together.

The two ends of the winding element 22 project through the appropriate holes 28. The one end 31 is solid, and has a threaded hole 32 that opens into the end face. Screwed into the threaded hole 32 is a countersunk screw 33 via which a plate-like support 34 is secured to the enlarged end 31 of the winding element 22. The support 34 has a circular contour with a radius that is greater than that of the end 31. Supported against the support 34 is a compression spring 35 that is also supported against the outer side of the leg 26 directly next to the opening 28 (see FIG. 3). The end 31, the support 34, and the spring 35 are surrounded by a sleeve 36 that is spaced slightly therefrom and that is welded to the outer side of the bracket leg 26 coaxial to the opening 28. The spring 35 is therefore disposed in a protected manner in an annular chamber 38 between the sleeve 36 and the end 31 of the winding element 22. In an axially outer direction, the annular chamber 38 is essentially covered by the support 34.

At the opposite end, the winding element 22 is provided with a grip or knob 39 with which it can be rotated about its axis. As shown in FIG. 4, the grip 39 has a bar-like configuration so that it can be comfortably grasped by hand. The length of the grip 39 is greater than the diameter of the hole 28. On that side facing the end 31, the grip 39 is provided with a detent 40 that is preferably integral with the grip. The opposite end 31, on that side that faces the grip 39, is provided with a further detent 41 that is also preferably integral with the winding element 22. Both of the detents 40, 41 assume the same position relative to the winding element 22; in other words, they are aligned with one another. In addition, the two detents 40, 41 can have the same dimensions. Each of the bracket legs 26, 27 is provided with an arresting notch 42, 43 that is associated with a respective one of the detents 40, 41, and in which the detents engage in a locking position. The winding element 22 is then prevented from rotating.

In the locking position, the winding element 22 is under the force of the spring 35, which urges the winding element into its locking position. In this position, the underside 44 of the grip 39, which underside faces the bracket 20, rests against the outer side 45 of the bracket leg 27, which outer side is remote from the bracket leg 26. In this locking position, the support 34 at the opposite end is still within the sleeve 36; the support 34 is preferably flush with the upper rim of the sleeve 36, so that a nearly even end is formed in this position. As shown in FIG. 4, the arresting notches 42, 43 are disposed at an acute angle α relative to the longitudinal axes or central longitudinal planes B of the bracket legs 26, 27. The longitudinal axis or central longitudinal plane A of the detent 40 is aligned with the longitudinal axis of the grip 39. In addition, the longitudinal axis of the pass-through slot 23 is disposed in the longitudinal central plane of the grip 39. Thus, when the winding element 22 is in its locking position, the pass-through slot 23 is disposed at the angle α relative to the central longitudinal plane of the bracket legs 26, 27. If the end of the belt is to be inserted into the pass-through slot 23, the winding element 22 must first be moved out of its locking position and into its belt-introduction position. For this purpose, it is necessary to axially displace the winding element 22, against the force of the spring 35, to such an extent that the detents 40, 41 are released from the arresting notches 42, 43. Subsequently, the winding element 22 can be rotated by the grip 39 until the pass-through slot 23 is disposed in the belt-introduction direction. This position is illustrated in FIGS. 3 and 4. The central longitudinal plane of the pass-through slot 23, and hence of the grip 39, are then disposed in the same plane as the central longitudinal plane of the bracket legs 26, 27. The end of the belt can then be easily inserted into the pass-through slot 23. Subsequently, the winding element 22 is rotated by the grip 39 until the detents 40, 41 are again disposed in the region of the arresting notches 42, 43 and can catch therein under the force of the spring 35. By again axially shifting and then rotating the winding element 22, the end of the belt can again be wound up.

The inventive belt connection mechanism 19 is easy to operate, so that it can even be operated by an inexperienced person without difficulty. In the locking position, the winding element 22 is satisfactorily prevented from being unintentionally rotated, so that the lashing cannot be accidentally released. To release the lashing, the winding element 22 must intentionally be manually axially shifted against the spring force. Since in the locking position the winding element 22 is prevented from rotating in either direction, the winding element cannot rotate unintentionally during operation. Since the sleeve 36 surrounds the support 34 and the spring 35, it also serves to protect the winding element 22 from accidental actuation. Since the detents 40, 41 are components of the winding element 22, assembly of the belt connection mechanism 19 is easy to carry out. In the event that the spring 35 becomes damaged, it can be easily replaced after the screw 33 is loosened and the support 34 is removed. In the locking position, the underside or abutment surface 44 of the grip 39 rests against the outer side 45 of the bracket leg 27 under the force of the spring 35, so that the winding element 22 is satisfactorily secured in the axial direction.

The free ends of the two bracket legs 26, 27 are interconnected by a bolt or pin 46 upon which is mounted a spacer tube 47 that rests against the inner sides of the bracket legs. The spacer 47 serves to guide the belt, and in the position of the ratchet mechanism 1 illustrated in FIG. 2 is disposed near the lower edge of the belt connection mechanism 19.

The inventive belt connection mechanism 19 requires only little installation space, especially with regard to the winding element 22 with its protection against rotation, so that the inventive belt connection mechanism 19 is especially suitable for installation anywhere that only little installation space or length is available. The ratchet mechanism 1 with a detachably connected belt connection mechanism 19 therefore has a relatively short length.

Figure 6:
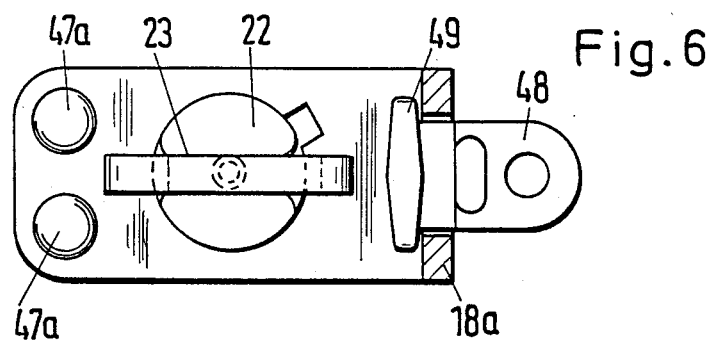
FIG. 6 is a partially cross-sectioned side view of the belt connection mechanism of FIG. 5.
Figure 5:
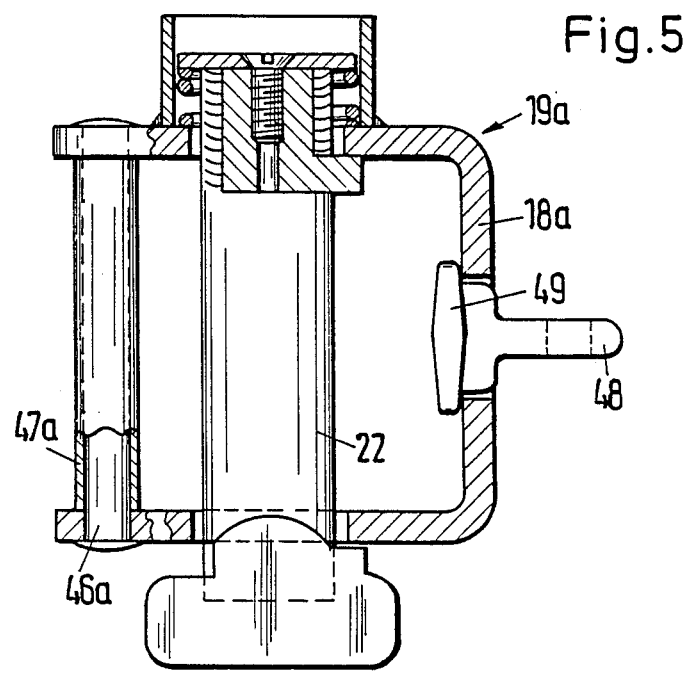
FIG. 5 is a cross-sectional view of a second exemplary embodiment of the inventive belt connection mechanism.

The belt connection mechanism 19a illustrated in FIGS. 5 and 6 is essentially identical to the embodiment described in FIGS. 1-4. However, instead of the openings 25, a connection element 48 is rotatably mounted in the crosspiece 18a. A hook, a link, or some other connecting member can be connected to the connection element 48. The latter has a head 49 that is supported against the underside of the crosspiece 18a. The winding element 22 with its protection against rotation is embodied in the same way as in the previously described embodiment. Instead of a single belt guidance, the belt connection mechanism 19a is provided with two belt guides 47a, each of which is formed by a spacer tube that is seated on the bolts or pins 46a. In the belt-introduction position (FIG. 6), the pass-through slot 23 of the winding element 22, when viewed in the direction of introduction, is disposed centrally between the two belt guides 47a, so that the end of the belt can easily be inserted between the two belt guides and into the pass-through slot. It should be understood that the embodiment of FIGS. 1 to 4 could also be provided with two such belt guides.

Figure 7:
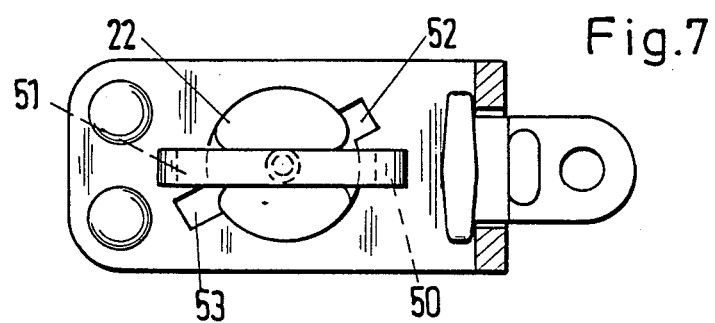
FIG. 7 is a partially cross-sectioned side view of a third exemplary embodiment of the inventive belt connection mechanism.

Since the winding element 22 is provided with two detents 40 and 41, relatively great lashing forces can be absorbed. To increase the strength, the winding element 22 can also be provided with a greater number of detents. Thus, for example, each end of the winding element 22 can be provided with two detents 50, 51 (see FIG. 7) that are disposed diametrically opposite one another. So that the winding element 22 does not already again reach a locking position after being rotated by only about 180°, the two detents 50, 51 at each end could, for example, have different lengths, with the associated arresting notches 52, 53 also having different lengths. As a result, the detents 50, 51 can reach a locking position only after being rotated approximately 360°. The greater number of detents permits a greater force to be transmitted, and hence also permits a greater tensioning force.

The present invention is, of course, in no way restricted to the specific disclosure of the specification and drawings, but also encompasses any modifications within the scope of the appended claims.

What we claimed is:

1. A belt connection mechanism having at least one rotatable connection element for a belt having an end, with said connection element being an inelastic rigid structure having ends respectively in two regions, being provided with a grip, and being mounted in a bracket, which has holes for said connection element to extend through, in such a way that said connection element has a longitudinal axis and can be shifted axially out of a locking position against spring force of spring means located on the bracket in a protected wall enclosure attached to said bracket and biasing said connection element in a direction toward the locking position, and thus biased back into said locking position with the aid of said spring force; said belt connection mechanism further comprising:

at least two detents, each extending transverse to the longitudinal axis of said connection element and provided respectively on at least said two end regions of said connection element which is rotatable by at least 360° before any engagement of said detents and as a result of which said belt end is wound onto said connection element, with said detents then engaging in appropriate arresting notches of said bracket in said locking position of said connection element; said connection element is furthermore provided with a pass-through slot for receiving said belt; and said bracket is provided with first abutment means, while said grip of said connection element is provided with second abutment means via which said grip, in said locking position and under said spring force, rests against said first abutment means.

2. A belt connection mechanism according to claim 1, in which each of said end regions of said connection element is provided with at least one of said detents.

3. A belt connection mechanism according to claim 2, in which said grip is provided at one of said ends of said connection element, with said at least one detent at that end being integral with said connection element and disposed on said grip.

4. A belt connection mechanism according to claim 3, in which said bracket is U-shaped and has two legs that have a central longitudinal plane; and in which, in said locking position of said connection element, said arresting notches and a central longitudinal plane of said pass-through slot are disposed at an acute angle to said central longitudinal plane of said bracket legs.

5. A belt connection mechanism according to claim 4, in which said grip has a bar-like configuration.

6. A belt connection mechanism according to claim 5, in which said holes for said connection element are respectively provided in said bracket legs, with the length of said grip being greater than the diameter of the hole of the adjacent bracket leg.

7. A belt connection mechanism according to claim 3, in which said second abutment means of said connection element is formed by a side of said grip that faces said bracket.

8. A belt connection mechanism according to claim 3, in which detents at opposite ends of said connection element, when viewed in the axial direction of the latter, are aligned with one another.

9. A belt connection mechanism according to claim 3, in which said wall enclosure includes a sleeve that is connected to said bracket and surrounds a receiving chamber; and which includes a compression spring that is accommodated in said receiving chamber and provides said spring force.

10. A belt connection mechanism according to claim 9, in which said connection element includes a support element for said spring, with said support element and said bracket delimiting said receiving chamber in the axial direction of said connection element.

11. A belt connection mechanism according to claim 10, in which said support element is detachably connected to said connection element and is disposed within said sleeve.

12. A belt connection mechanism according to claim 11, in which said sleeve is disposed on that end of said connection element remote from said grip.

13. A belt connection mechanism according to claim 2, in which each of said end regions of said connection element is provided with at least two detents, with said detents being disposed diametrically across from one another and being of different lengths.

14. A belt connection mechanism according to claim 2, in which said bracket is provided with a connection element for some other structural member.

15. A belt connection mechanism according to claim 14, in which said connection element is rotatably mounted in said bracket.

* * * * *